(12) United States Patent
Yan

(10) Patent No.: US 9,250,747 B2
(45) Date of Patent: Feb. 2, 2016

(54) TOUCHLESS INPUT DEVICES USING IMAGE SENSORS

(71) Applicant: Yong Yan, Fremont, CA (US)

(72) Inventor: Yong Yan, Fremont, CA (US)

( * ) Notice: Subject to any disclaimer, the term of this patent is extended or adjusted under 35 U.S.C. 154(b) by 0 days.

(21) Appl. No.: 14/228,125

(22) Filed: Mar. 27, 2014

(65) Prior Publication Data

US 2015/0277667 A1  Oct. 1, 2015

(51) Int. Cl.
*G06F 3/042* (2006.01)
*G06F 3/03* (2006.01)

(52) U.S. Cl.
CPC ............ *G06F 3/0425* (2013.01); *G06F 3/0304* (2013.01); *G06F 2203/04108* (2013.01)

(58) Field of Classification Search
None
See application file for complete search history.

(56) References Cited

U.S. PATENT DOCUMENTS

| 2012/0062513 A1* | 3/2012 | Kang et al. ..................... 345/174 |
| 2014/0210716 A1* | 7/2014 | Yang et al. ..................... 345/158 |
| 2014/0267169 A1* | 9/2014 | Mckiel, Jr. ............ G06F 3/0421 345/175 |

* cited by examiner

*Primary Examiner* — Joseph Haley
*Assistant Examiner* — Ifedayo Iluyomade

(57) ABSTRACT

A touchless input device has image sensors on the side of a surface to capture the positions and movement of fingers or any visible objects working near or on the surface. Embodiments include touchless data entry keyboards, touchless pointing devices, and touchless screens. It provides better performance, finer resolution, and more clearly defined action space than infrared beam based touchless input devices. In particular, one embodiment merges the space for data entry and the space for cursor movement into one and reduces the number of devices and working space needed by users.

7 Claims, 2 Drawing Sheets

TOUCHLESS INPUT DEVICES USING IMAGE SENSORS

BACKGROUND

Prior Art

Today's touchless input devices, such as touchless keyboards and touchless touch-pad, mainly use the infrared beam detection technology. They basically detect if the infrared beams are blocked or reflected, and use the state change as input signals.

The major benefit of such devices for the users are that the forces on fingers can be reduced or even avoided. Such devices are especially needed by those with injured hands or arthritic fingers.

However, infrared beam based input devices have some technical limitations that make it difficult to be adopted by a wider user base for practical use. One limitation is that the cross sections of the infrared beams are very small. Users' fingers often miss these spots and result in missed letters and less than desirable performance for many touch-typists.

Another issue is that when the size of the keyboard becomes large, the speed of the key response becomes too slow for a high performance keyboard.

The main issue with using infrared beams for pointing devices is that it is difficult to achieve the resolution for the pixel densities of today's display screen. Another issue is that the respond speed of beam action detection can hardly satisfy users' desire today.

It is also difficult to satisfy all users with one height of the sensitive areas. The first challenge is the difficulty of controlling the shape and strength of light beams in an extended range. Another challenge is that some people would like a tactile feedback with lower height of interactive space, while some others with nerve diseases on their finger tips want a higher space to avoid touching completely.

SUMMARY

In accordance with one embodiment, an input device comprises a board with two image sensors on the side, a circuit that connects the image sensors to a microprocessor, and a circuit that enable the microprocessor to communicate with a host computer.

ADVANTAGES

By using image capture and analysis rather than infrared beam detection, advantages are as follows: each input area can be arbitrarily large within the visible region of the image sensors, that the respond speed can be controlled and improved by using faster processors, that the triggering space can be well defined and adjustable by users with identifiable structures on the board, that the resolution can be controlled by the resolution of the image sensors. Other advantages of one or more aspects will be apparent from a consideration of the drawings and ensuing description.

DRAWINGS

Figures

REFERENCE NUMERALS

10—an image sensor
12—an image sensor
14—a board providing a surface
16—a raised structure on the surface
18—a raised structure on the surface
20—an area on the surface with action space for the left button of a mouse
22—an area on the surface with action space for the middle button of a mouse
24—an area on the surface with action space for the right button of a mouse
26—an area on the surface with action space for the scrolling-up function of the wheel on a mouse
28—an area on the surface with action space for the scrolling-down function of the wheel on a mouse
30—entry point for a finger to move cursor on a keyboard panel
32—toggle spot for switching the action spaces between data entry and cursor movement

DETAILED DESCRIPTION

FIG. 1

First Embodiment

Figure 1:
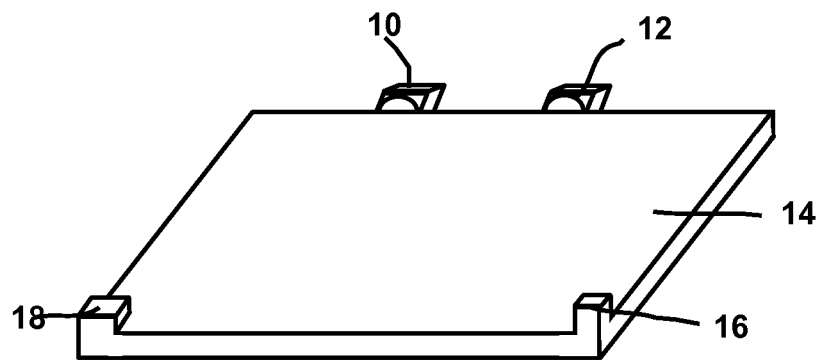
FIG. 1 shows an embodiment of an input device using 2 image sensors and a transparent board.

FIG. 1 shows the basic structure of an input device with image sensors 10 and 12 on the side of aboard 14. The raised structures 16 and 18 at corners of board 14 within the visual field of the image sensors define the height of the region within which an object or finger can trigger input signals. If the heights of structures 16 and 18 are not equal, then the straight connection line between them sweeps horizontally and forms a ceiling surface.

The space formed by an area on the board surface and a ceiling surface will be referred to as the action space of the area hereafter. An object or finger can trigger input signals only within this action space.

By using two image sensors, the position of a visible object on the surface can be uniquely calculated. This is because the image of an object in the image sensor has a distance in pixels from the center of the image plane of the sensor. The deviation angle of the object from the center of the view field can be obtained from this distance. The position of the object can thus be obtained from the distance between the two image sensors, and the two deviation angles formed by the object with the two image centers using trigonometry.

The benefit of using raised structures to define the action space is that the users can change the raised structure and tailor the size and height of the action space to their special needs.

Board 14 is transparent here so that a display screen can be placed underneath. Board 14 can also be just a display screen. When a finger moves within an action space that overlays a certain displayed region or elements, input signals are sent to a host computer.

The edges of board 14 can also be raised and block the images of outside objects from entering the image sensors. This can save some processing time to improve the performance of the device.

Operation—FIG. 1

A user can use fingers or any visible object such as a stylus to operate this device to enter signals to a connected computer. The manner of operation is almost the same as a regular tablet computer except that the fingers don't have to be in contact with board 14, as long as they enter the action space.

The user can tap the action space for a clicking action, slide a finger for moving the displayed image, or perform any other gestures that the host computer can associate a command with.

Figure 2:
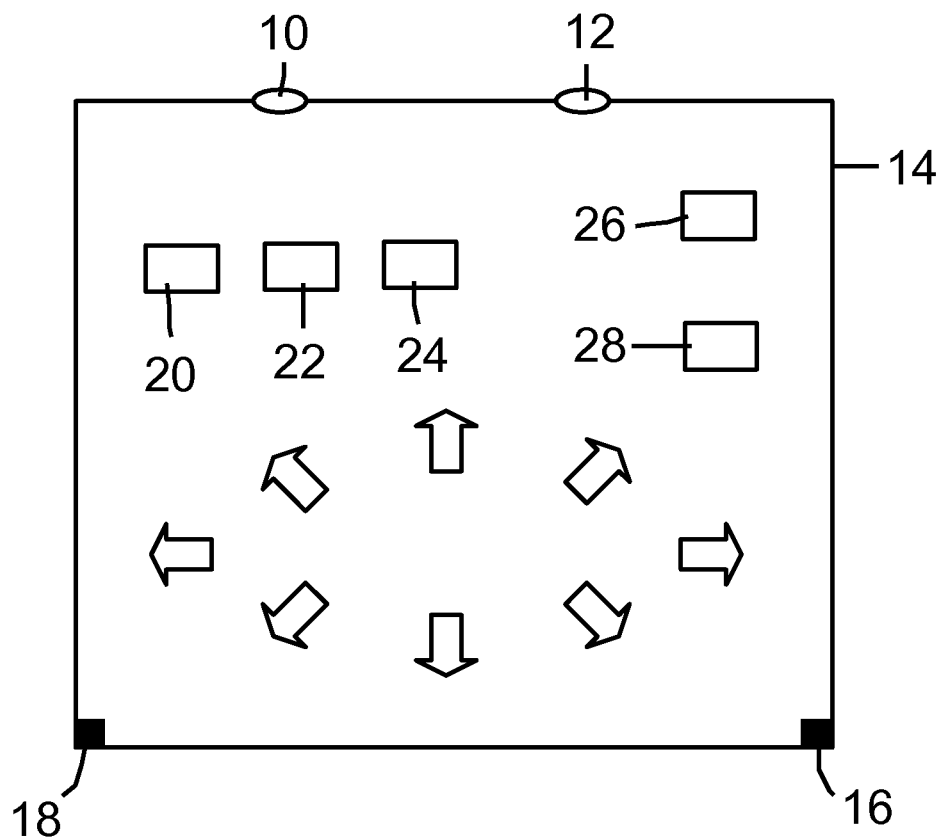
FIG. 2 illustrates an embodiment for performing the functions of a pointing device.

FIG. 2—An Embodiment as a Pointing Device

FIG. 2 illustrates an embodiment to perform all the functions of a mouse. The viewing angle is from the top. Image sensors 10 and 12 are on the side of board 14. Raised corners 16 and 18 define the height of the action space. On board 14, areas 20, 22, 24, 26, and 28 are designated functional areas.

Areas 20, 22, and 24 correspond to the left, middle, and right mouse buttons. When a finger enters the action space of one of the areas, a signal of the corresponding mouse button being pressed down is sent to a host computer. When the finger leaves the action space, a signal of the button being released is sent to the host computer.

The area 26 and 28 correspond to the scrolling-up and scrolling-down functions of the wheel. When a finger enters the action space, a corresponding wheel-scrolling signal will be sent to the host computer. When the finger leaves the space, a signal of wheel-scrolling stopped is sent to the host computer.

When a finger is moving within the action space but outside of the designated functional areas, signals of cursor movement are sent to the host computer. A quick tap on this space can also be considered a left mouse button click.

The action space associated with the arrow shaped labels are also for controlling the cursor movement. When a finger is paced in the action space of an area with an arrow label, the cursor will move at a predetermined speed in the direction of the arrow.

Operation—FIG. 2

The operation this embodiment is almost the same as a regular touch-pad except that the fingers don't have to be in contact with board 14 when they are within the action space.

To trigger a mouse button event, a user moves a finger into the action space of the intended button area to trigger a button-being-pressed signal. The user moves the finger out of the action space to release the button.

To move a scroll bar, a user places a finger in the action space of intended wheel scrolling area. The user stops the scrolling by moving the finger out of the action space.

A user can move the cursor by moving a finger along the surface within the action space just like using a touch-pad, or by placing a finger in the action space of an arrow label to move the cursor in a specific direction at a specific speed.

Thus, this embodiment fully realizes all the functions of a mouse with the advantage of reducing the force and movement of fingers. And the action space is well defined.

Today's image sensors have millions of pixels in their imaging plane, providing enough resolution for most of display screens today.

Figure 3:
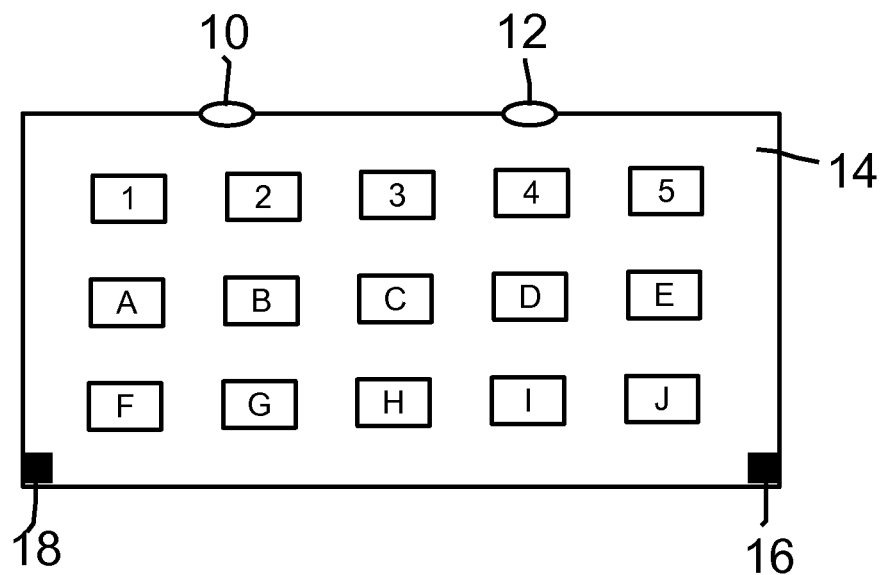
FIG. 3 illustrates an embodiment of a keyboard.

FIG. 3—An Embodiment as a Data Entry Device

FIG. 3 illustrates an embodiment as a keyboard. The viewing angle is from the top. Image sensors 10 and 12 are on the side of a board 14. Raised corners 16 and 18 define the height of the action space.

There are some areas with alphanumeric labels on the board 14. These areas are designated as key entries corresponding to the labels. When a finger or an object enters one of the action space of theses areas, a key-down signal is sent to a host computer. When the finger or object leaves the action space, a key-up signal is sent to the host computer.

Because the height of 16 and 18 are adjustable by users, the height of the action space can be changed by users easily.

Operation—FIG. 3

A user operates this keypad by moving a finger in and then out of the action space of an area with intended label to enter the label to a connected computer. The force on fingers of pressing down a button of a regular keyboard can be avoided here.

Figure 4:
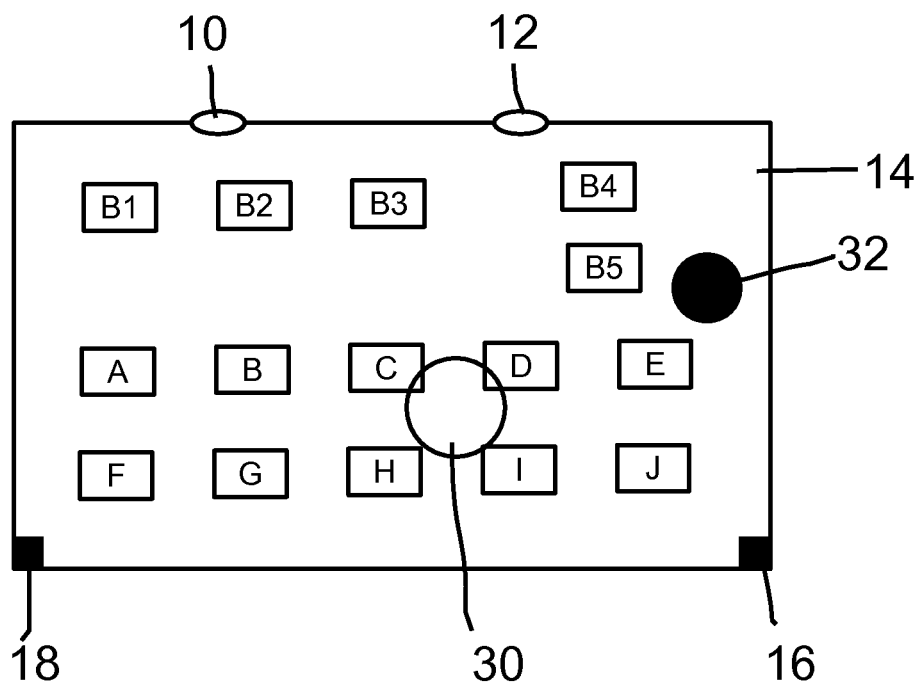
FIG. 4 illustrates an embodiment of combining a keyboard and a mouse into one unit.

FIG. 4—Embodiment to Combine the Data Entry and Pointing Functions in One Space

FIG. 4 illustrates an embodiment for a combination of data entry and pointing devices. The viewing angle is from the top. Image sensors 10 and 12 are on the side of a board 14. Raised corners 16 and 18 define the height of the action space.

There are some areas with labels on board 14. The areas B1, B2, and B3 correspond to the left, middle, and right buttons of a mouse. The areas B4 and B5 correspond to the scrolling-up and scrolling-down actions of the wheel. When a finger or stick enters the action spaces of these areas, corresponding signals are sent to a host computer.

Other areas are designated as key entries corresponding to their labels. When a finger or an object enters one of the action space of these areas, a key-down signal is sent to a host computer. When the finger or object leaves the space, a key-up signal is sent to the host computer.

Area 30 is a designated area for a starting point of moving the cursor. When a finger or object enters into its action space from above, and starts moving within the action space of board 14, the image sensors and the processor will obtain and convert the data from the movement into cursor movement signals, and then send the signals to the host computer.

By overlaying cursor movement space with key entries, users can save some working space and the number of devices.

Spot 32 serves as a switch button for the action space of board 14 to work as a keyboard or a pointing device. When a visible object quickly moves in and then out of the action space of spot 32, the action space of board 14 works as a pointing device as illustrated above. When a visible object enters and then leaves the action space of spot 32 quickly again, the action spaces of data labels toggle back to keyboard entries.

Operation—FIG. 4

A user can use this embodiment to do the work that usually require two devices, a keypad and a pointing device. A user moves a finger in and then out of the action space of the area with an intended label to enter characters into a connected computer. The user can also do the work of mouse button clicks and wheel scrolling by acting on the corresponding action space as illustrated above.

When a user wants to move the cursor while doing data entry, the user enters a finger from above into the action space of area 30, and move the finger within the action space of board 14 in the direction of intended cursor movement. The cursor stops moving when the finger lifts out of the action space.

When a user wants to use a pointing device for a while, the user taps the action space of spot 32 and turn off the data entry functions of the device. Then the device works just like a pointing device as illustrated in FIG. 2. When the user wants to use the data entry function again, tapping the action space of spot 32 turns on again the data entry functions of the actions spaces of the areas with character labels.

ADVANTAGES

From the description above, a number of advantages of some embodiments of my input devices using image sensors on the side of a board become evident:

(a) The action space, especially the height, are visibly defined and can be modified by users to meet different users' special needs.
(b) The resolution of pointing devices depend on the pixel densities of the image sensors, and can be fine enough for most of the display screens today.
(c) The key sizes for data entries can be much larger than the regular sizes of a human finger to satisfy most users' desire without compromising the performance.
(d) Any visible objects can be used for input. More flexible than most touch screens.
(e) Avoiding force or strain on fingers, and reducing the movement of fingers.
(f) Save user some working spaces and the number of devices to work with.

CONCLUSION, RAMIFICATIONS, AND SCOPE

Accordingly, the reader will see that this type of image sensor based input devices can be used in place of traditional keyboards and mice, as well as touch screens on mobile devices. Furthermore, this type of input devices has the additional advantages in that:

The area for finger action does not have any electronic elements or circuit board. The device can be much lighter than the traditional ones.

The electronic components are independent of the size of the board. The manufacturing cost is therefore less relevant to the total size.

Although the description above contains some specificity, these should not be construed as limiting the scope of the embodiments but as merely providing illustrations of some of the embodiments. For example, the image sensors don't have to be placed on one side; the image sensors don't have to face the same direction; there can be more than two image sensors to facilitate faster processing; the raised structures can be of different colors at different places; there can be more labeled areas for various functions; the action space can be predetermined and adjusted purely by software, etc.

Thus the scope of the embodiments should be determined by the appended claims and their legal equivalents, rather than by the examples given.

I claim:

1. An input device comprising a microprocessor and connection circuitry for communicating with a host computer, and in particular: a. a plurality of image sensors, b. a surface of a board, and c. an action space formed by said board surface and a predetermined height above said board surface, and that d. said image sensors are attached beside said board, facing and capturing images of said action space along the parallel direction of said board surface, and that e. any visible objects entering, leaving, and moving within said action space are considered different input actions and captured in image data that are processed and converted into input signals by said microprocessor, and that f. said signals are sent to said computer via said circuitry, whereby a user can perform position accurate input operations at a high speed with the choice of touching or not touching said board at will to operate a computer.

2. An input device comprising a microprocessor and connection circuitry for communicating with a host computer, and in particular: a. a plurality of image sensors, b. a surface of a board, and c. an action space formed by said board surface and a raised structure above said board surface that a user can adjust to define a height, and that d. said image sensors are attached beside said board, facing and capturing images of said action space along the parallel direction of said board surface, and that e. the events of any visible objects movement, including entering, leaving, and moving within said action space are all considered distinct input actions and captured in image data that are processed and converted into input signals by said microprocessor, and that f. said signals are sent to said computer via said circuitry, whereby a user can perform position accurate input operations at a high speed with the choice of touching or not touching said board at will to operate a computer.

3. The device of claim 2, wherein said board has separate areas whose corresponding action spaces are designated for the functions of a mouse including those of all three buttons, wheel, and cursor movement such that any function of a mouse can be triggered when a visible object enters said corresponding action space.

4. The device of claim 2, wherein said surface has data labels for data entry functions, and one or more special areas such that when a visible object enters the action space of said special areas from above, and moves thereafter within said action space of said board, the movement of said object generates input signals to move the cursor of said computer even when said object moves over any data labels, and data entry signals can still be generated when any other visible objects enter the action space of said data labels.

5. An input method of converting the positions and movement of any visible objects on or near a surface of a board to input signals for a host computer comprising: a. attaching a plurality of image sensors beside said board, capturing images along the parallel direction of said surface, b. providing an action space formed by said surface and a structure above said surface that users can change to define a height and is within the viewing field of said image sensors, c. connecting a microprocessor with said image sensors and said computer with circuitry, d. obtaining image data from said image sensors by said processor, e. converting said image data to input signals by said processor when any visible objects entering, leaving, and moving within said action space are considered as different input actions, f. sending said input signals to said computer by said processor, whereby a user can operate said computer with any visible objects at a high speed with the choice of touching or not touching the board at will.

6. The method of claim 5 wherein said board has separate areas whose corresponding action spaces are for generating input signals for functions of a mouse, including clicking of three buttons, scrolling, moving a cursor, dragging and dropping graphical objects on a display of said host computer such that any function of a mouse can be triggered by a visible object entering said corresponding action space.

7. The method of claim 5 wherein providing data labels for data entry on said board, providing one or more special areas such that if an visible object enters the action space of said special areas from above and moves within the whole action space of said board thereafter, said movement of said visible object induces cursor movement on said host computer even when said visible object moves over any said data labels while other visible objects still trigger key-down signals of any said data labels upon entering the action spaces of said data labels.

* * * * *